UNITED STATES PATENT OFFICE.

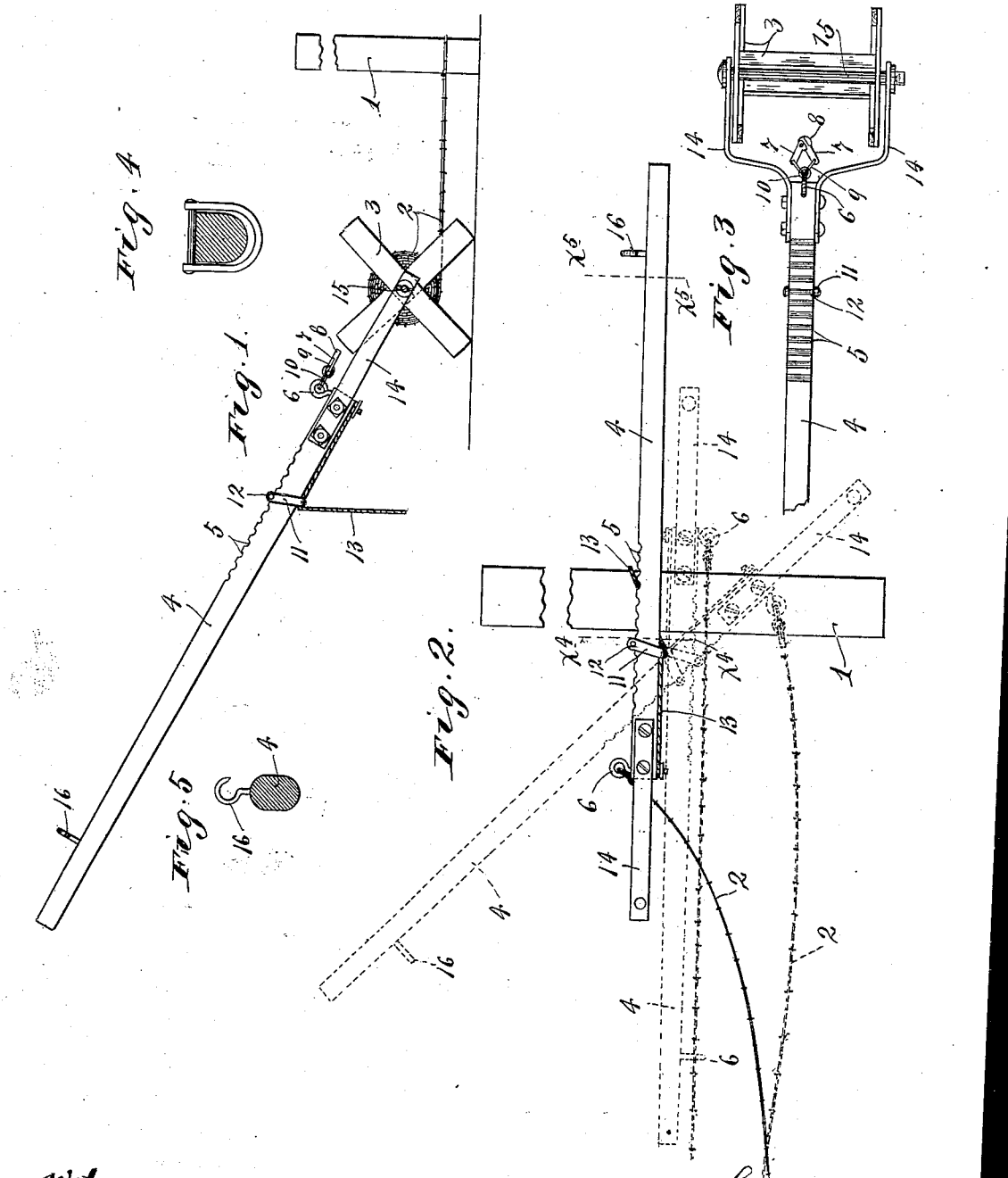

JOHN OLSON, OF BELGRADE, MINNESOTA.

WIRE-STRETCHER.

No. 898,500.  Specification of Letters Patent.  Patented Sept. 15, 1908.

Application filed January 27, 1908. Serial No. 412,753.

*To all whom it may concern:*

Be it known that I, JOHN OLSON, a citizen of the United States, residing at Belgrade, in the county of Stearns and State of Minnesota, have invented certain new and useful Improvements in Wire-Stretchers; and I do hereby declare the following to be a full, clear, and exact description of the invention, such as will enable others skilled in the art to which it appertains to make and use the same.

My invention has for its object to provide an improved wire stretcher especially adapted for use in stretching the barbed or other line wires of wire fences; and to this end it consists of the novel devices and combinations of devices hereinafter described and defined in the claims.

The invention is illustrated in the accompanying drawings, wherein like characters indicate like parts throughout the several views.

Referring to the drawings, Figure 1 is a view in side elevation, showing the improved device applied to the spool of a coil of barbed wire, and used to draw the said spool and coil over the ground. Fig. 2 is a view in side elevation, with some parts broken away, illustrating the action of the improved wire stretcher when connected to a post and to a fence wire to be stretched. Fig. 3 is a plan view of the parts shown in Fig. 1. Fig. 4 is a detail in section on the line $x^4 x^4$ of Fig. 2; and Fig. 5 is a section on the line $x^5 x^5$ of Fig. 2.

In the drawings the numeral 1 indicates a fence post and the numeral 2 an ordinary barbed fence wire. A coil of this barbed wire is placed on a large wooden spool or drum 3.

The body of the improved wire stretcher is in the form of a bar 4 provided, on one edge, with notches or serrations 5 and having, at one end, a transversely extended swiveled eye-bolt 6. A suitable toggle-acting wire grapple is connected to the head of the eye-bolt 6. As shown, this grapple is made up of a pair of levers 7 having eccentric clamping jaws 8, and a pair of links 9, which latter, as shown, are directly connected to the head of the eye-bolt 6 by a ring 10. This wire grapple, however, may be of any suitable form, as far as my invention is concerned.

Working loosely on the body of the bar 4 is a metal yoke 11, the prongs of which are connected, by a transverse bolt 12, that is adapted to be engaged with any one of the notches 5.

An anchoring rope or cable 13 is secured to the stem end of the eye-bolt 6 and is passed through the yoke 11 on that edge of the bar 4 that is opposite to the notched edge 5. A pair of laterally spaced metal straps or arms 14 are rigidly secured preferably to that end of the bar 4 to which the eye-bolt 6 is applied. By means of a long bolt or rod 15, the wire spool 3 is adapted to be pivotally connected to the prongs 14, when desired. A hook 16 is applied to the bar 4 at or near its free end.

When it is desired to lay the barbed wire along the row of fence posts to which it is to be applied, the spool 3 is pivotally connected to the prongs 14 by the bolt 15, as shown in Figs. 1 and 3, and one end of the wire is attached to one of the posts, preferably to a corner post. Then the spool may be pulled along and rotated by using the bar 4 as a bolt or hand-piece, so as to leave the wire in convenient position for application to the post.

When the device is to be used as a wire stretcher, the spool 3 should, of course, be removed. In Fig. 2 the full lines show the wire stretcher connected to the post 1 by the anchoring rope or cable 13, and it shows the end of the wire which is to be stretched, caught and held by the grapple jaws 8. To stretch the wire, the bar 4 should be turned from the horizontal position indicated by full lines, into the reverse horizontal position indicated by dotted lines in Fig. 2. The oblique position of the bar 4, indicated by dotted lines in Fig. 2, is simply an intermediate position in which part of the slack of a wire has been taken up. When the bar 4 is thus moved pivotally from one extreme position to the other, a pivot or fulcrum therefor is afforded at the connection between the anchoring cable 13 and the yoke 11, and the amount of slack in the wire that will be taken up is approximately equal to twice the distance between the said yoke 11 and the head of the eye-bolt 6 to which the wire grapple is applied. Hence, as is evident, any desired amount of slack, within certain limits, may be taken up by the proper adjustments of the yoke 11 in respect to the notches 5 in the bar 4. When the said bar 4 is turned into its extreme position, indicated by dotted lines in Fig. 2, the hook 16 thereof may be hooked onto the tightly drawn wire, so as to thereby secure the said bar in such position while the wire is being secured, by staples or other suitable devices, to the post. It is here very important to note that with the device above described the end of the tightly drawn wire is carried to a point past the post to which it is to be secured. This is very important, especially when the line wire is to be connected to a corner post and where, of course, there is no post further beyond which will serve as a base of reaction for the stretching of the wire. Hitherto, in stretching a wire for application to a corner post, it has been customary to put up a temporary post at a point beyond the corner post to serve as a base of reaction for pulling the wire past the corner post. My improved wire stretcher, as is evident, makes this unnecessary. The swiveled eye-bolt 6 permits the grapple to adapt itself to the line of strain, even when the lever-acting bar 4 is given a lateral as well as vertical pivotal motion in turning it from one position to another.

This device, while termed a wire stretcher, is, of course, capable of use generally as a line tightener.

The device above described is simple, of small cost, and at the same time is efficient for the purposes had in view.

What I claim is:

1. In a wire stretcher, the combination with a lever-acting bar, one edge of which is notched, of a hook applied to one end of said bar, an eye-bolt applied to the other end of said bar, a wire grapple connected to said eye-bolt, a yoke adjustably mounted on the intermediate portion of said bar, and an anchoring rope or cable attached to said bar at one end, passed through said yoke and coöperating with said yoke to pivotally connect said bar to a post, substantially as described.

2. A wire stretcher comprising a lever-acting bar provided at one end with laterally spaced prongs and a wire engaging grapple, a yoke adjustably mounted on the intermediate portion of said bar, and a rope or cable coöperating with said yoke to pivotally connect said bar to a post, substantially as described.

In testimony whereof I affix my signature in presence of two witnesses.

JOHN OLSON.

Witnesses:
J. A. KRICK,
J. N. KOETTER.